US007933413B2

(12) United States Patent
Steeves et al.

(10) Patent No.: US 7,933,413 B2
(45) Date of Patent: Apr. 26, 2011

(54) KEY EXCHANGE VERIFICATION

(75) Inventors: David J. Steeves, Seattle, WA (US);
Gregory D. Hartrell, Sammamish, WA (US); Ryan M. Burkhardt, Redmond, WA (US); Jason L. Cohen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 666 days.

(21) Appl. No.: 11/670,857

(22) Filed: Feb. 2, 2007

(65) Prior Publication Data

US 2008/0189548 A1 Aug. 7, 2008

(51) Int. Cl.
*H04L 9/08* (2006.01)
*H04L 9/00* (2006.01)
*H04L 9/32* (2006.01)

(52) U.S. Cl. ........ 380/278; 380/259; 380/260; 380/277; 713/168; 713/171

(58) Field of Classification Search .................. 380/278; 713/171
See application file for complete search history.

(56) References Cited

U.S. PATENT DOCUMENTS

| | | | | | |
|---|---|---|---|---|---|
| 5,675,648 | A | * | 10/1997 | Townsend | 380/278 |
| 5,696,880 | A | * | 12/1997 | Gustafson et al. | 704/273 |
| 6,865,681 | B2 | | 3/2005 | Nuutinen | |
| 6,907,034 | B1 | * | 6/2005 | Begis | 370/354 |
| 7,039,946 | B1 | | 5/2006 | Binding | |
| 7,131,004 | B1 | * | 10/2006 | Lyle | 713/169 |
| 2002/0025042 | A1 | | 2/2002 | Saito | |
| 2002/0059516 | A1 | | 5/2002 | Turtiainen | |
| 2003/0081774 | A1 | | 5/2003 | Lin | |
| 2003/0123434 | A1 | | 7/2003 | Hirayama | |
| 2003/0172280 | A1 | | 9/2003 | Edward | |
| 2005/0044365 | A1 | | 2/2005 | Haukka | |
| 2005/0182937 | A1 | | 8/2005 | Bedi | |
| 2005/0185644 | A1 | | 8/2005 | Tsuji | |
| 2006/0005033 | A1 | * | 1/2006 | Wood | 713/182 |
| 2006/0190730 | A1 | | 8/2006 | Iwamura | |
| 2006/0206705 | A1 | | 9/2006 | Khosravi | |
| 2007/0112962 | A1 | * | 5/2007 | Lewontin | 709/227 |

(Continued)

FOREIGN PATENT DOCUMENTS

JP 11-149414 A 6/1999

(Continued)

OTHER PUBLICATIONS

Educated Guesswork. Detecting MITM attacks on VoIP systems. May 5, 2006. http://www.educatedguesswork.org/ movabletype/archives/2006/05/detecting_mitm.html. Last accessed Dec. 7, 2006.

(Continued)

*Primary Examiner* — Ashok B Patel
*Assistant Examiner* — Alexander Lagor
(74) *Attorney, Agent, or Firm* — Turocy & Watson, LLP

(57) ABSTRACT

Key exchanges between peer-to-peer devices can be vulnerable to man in the middle attacks. Verification of the key exchanges can be made on a channel, network and/or device different from the channel, network and/or device used for the key exchange to determine whether the key exchange was secure. Verification of the key exchange can also be made through an established and trusted device and/or entity. If the key exchange was secure, the parties to a communication utilizing the key(s) exchanged can be notified, if desired. If the key exchange was not secure, the parties can be notified and the communication can be selectively disconnected.

20 Claims, 10 Drawing Sheets

U.S. PATENT DOCUMENTS

2007/0233860 A1* 10/2007 Lillie et al. .................. 709/225

FOREIGN PATENT DOCUMENTS

| JP | 14-217896 A | 8/2002 |
|---|---|---|
| WO | WO2005002131 | 1/2005 |

OTHER PUBLICATIONS

Borderware. Securing and Federating VoIP Using Encryption—A Discussion of ZRTP Implementation Models. http://www.borderware.com/pdfsWP_Zfone_0906.pdf. Last accessed Dec. 7, 2006.

Simon Horne. Technical Paper—eaRTP—Encryption and Authentication with Real Time Protocol—An End-to-End Security framework within deployed H.323 networks. Packetizer Labs. Nov. 28, 2005. http//www.packertizer.com/labs/eaRTP.pdf. Last accessed Dec. 7, 2006.

International Search Report and Written Opinion dated Jun. 30, 2008 for PCT Application Serial No. PCT/US2008/052698, 10 pages.

* cited by examiner

KEY EXCHANGE VERIFICATION

BACKGROUND

Computing devices are commonly utilized by users to communicate almost instantaneously with one or more contacts. Such information exchange can occur by a user entering information (e.g., text, visual, audio, and so on) into a display area of a user device and communicating with the one or more contacts in a back-and-forth manner using a multitude of communication means. This almost instantaneous communication allows a user and various contacts in disparate locations to communicate in a real time fashion.

Cryptographic key exchanges are utilized to protect data and communications. Such keys can be employed to allow messages, data, packets, video, and other communications to be transmitted without such message, data, or packet being read and understood by someone other than the intended recipient. For peer-to-peer communications, such as between mobile phones for example, the cryptographic key exchange protocols are vulnerable to attacks known as "Man in the Middle" attacks. Thus, infrastructures utilizing a center server through which all communications are transmitted have been established to facilitate secure key exchanges and communications. However, such infrastructures can be expensive and require trusting the central server (and the personnel associated therewith).

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with verifying key exchanges utilizing one or more channels (e.g., communication channel) that are different from the channel utilized to exchange the keys. A multitude of different devices or channels can be utilized depending on the security level desired. If the key exchange is verified, the users are notified of the secured connection. If a key exchange is not verified, the users are notified the connection is not secured and the communication can be disabled.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
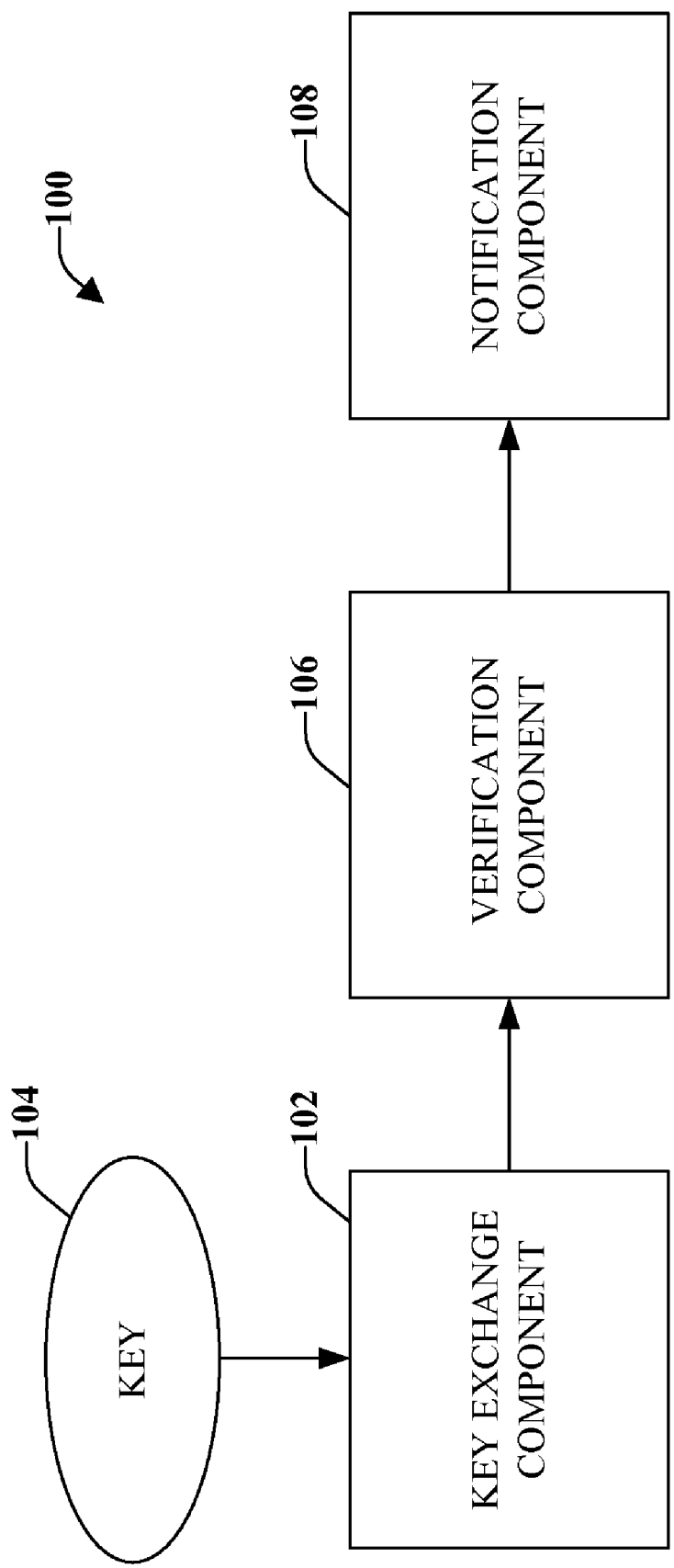
FIG. 1 illustrates a high-level block diagram of a system for automatically verifying key exchange integrity.

Various embodiments are now described with reference to the drawings. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various embodiments disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Referring initially to FIG. 1, illustrated is a high-level block diagram of a system 100 for automatically verifying key exchange integrity. System 100 can be embodied on mobile communication devices or other communication devices and can be configured to utilize a separate interface, connection, device and/or trusted third party to verify a key exchange. Devices that utilize system 100 can respond to key exchange verification requests automatically or through user interaction in accordance with the various embodiments disclosed herein.

In further detail, system 100 includes a receiver component 102 that can be configured to facilitate key exchanges, which can be asymmetric keys or symmetric keys. In symmetric key cryptography, the same key is used for both encryption and decryption. Asymmetric cryptography, as its name implies, unevenly divides processing demands based on the use of the public and private keys. Any type of key exchange can be utilized with the disclosed embodiments and the embodiments are not limited to the types of key exchanges that may be shown and described herein.

Peer-to-peer devices can be vulnerable to man in the middle attacks. Such attacks can be conducted by persons intending to maliciously alter and/or use data for their own purposes by intercepting information transmitted digitally. Such interception can occur during the key exchange and the communication transmitted after such key exchange can be vulnerable to such attacks, without the knowledge of the persons communicating the information. Therefore, a verification component 106 can be configured to verify that the key exchange occurred without being intercepted by persons to whom the communication is not intended (e.g., man in the middle).

Verification component 106 can receive the key exchange information 104 from receiver component 102 and utilize a separate interface and/or connection to verify the key exchange. Examples of interfaces include, but are not limited to Systems Management Server (SMS), General Packet Radio Service (GPRS), shared secret with contact (e.g., email, text message, phone, Voice over Internet Protocol (VoIP)), Bluetooth™, Infra-Red (IR), routing protocols, and so forth. The verification can be initiated automatically or through user-interaction (e.g., a user request for verification that the key exchange was secure).

The key exchange can be verified, indicating the communication is secure, or not verified, indicating the communication has been intercepted by a third party. A notification relating to the verification or non-verification can be communicated to the user through notification component 108. Such notification can be provided in various interfaces (e.g., audio, visual, and so forth).

Through utilization of system 100, a user can initiate a communication, key exchange can occur and a connection can be established. At substantially the same time as the communication begins, or in accordance with some embodiments before a communication is started, verification component 106 can verify whether the communication is secure. If the communication is secure, notification component 108 can provide such information to the one or more persons communicating. If the communication is not secure, notification component 108 can notify the users and, in some embodiments, automatically disconnect or otherwise discontinue the communication.

Figure 2:
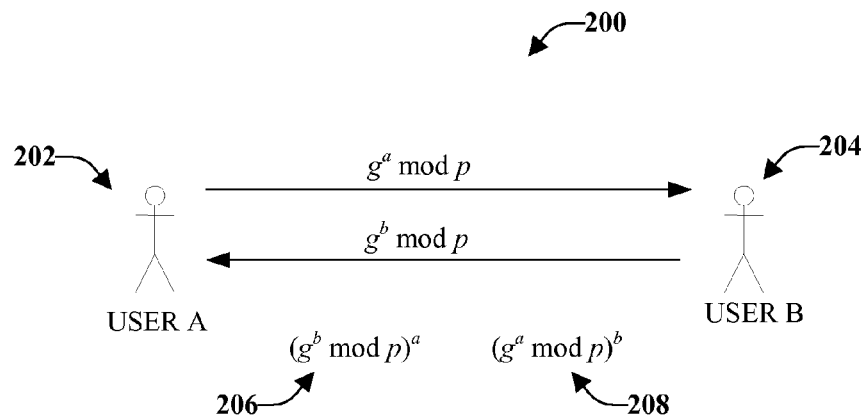
FIG. 2 illustrates a visual representation of a key exchange.

FIG. 2 illustrates a visual representation of a key exchange 200. It should be understood that the Diffie-Hellmen key exchanges illustrated and discussed herein are for example purposes only and other types of key exchanges can be utilized with the disclosed embodiments. The basic idea of peer-to-peer key exchanges is that two peers or two user devices agree on a secret key that can be utilized for encrypting communications.

In this example, User "A" 202, is a typical home user and User "B" 204 is a person, company, establishment or other entity with which User A 202 wants to contact for the first time. User A 202 wants to use a smart phone (although other devices can be utilized) on an untrusted wireless network in her local web café to initiate a VoIP conversation with User B.

Since this is the first communication between these parties, a key exchange is needed for a secure connection with User B 204 (e.g., VoIP, https, and so forth). Thus, both User A 202 and User B 204 (e.g., through respective devices) agree to use a prime number p and base g. User A 202 chooses a secret integer a and sends ($g^a$ mod p) to User B 204. Similarly, User B 204 chooses a secret integer b, and sends to User A 202 ($g^b$ mod p). User A 202 can compute ($g^b$ mod p)$^a$ mod p 206 and User B can compute ($g^a$ mod p)$^b$ mod p 208. Thus, the key exchange is complete.

Figure 3:
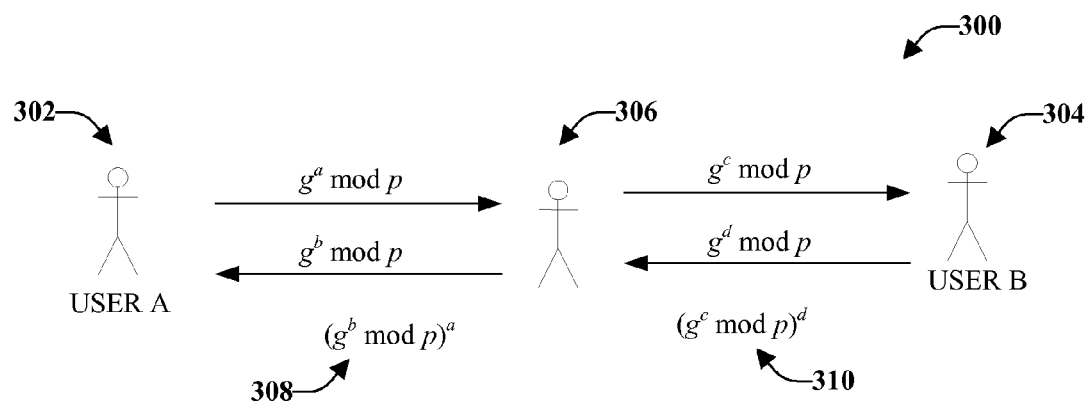
FIG. 3 illustrates a visual representation of key exchange subject to a man in the middle attack.

FIG. 3 illustrates a visual representation of a key exchange 300 subject to a man in the middle attack. The situation in this example is similar to that described above. However, in this peer to peer communication a third party is involved and consumes the keys and exchanges those keys with their own keys in order to manipulate the data (e.g., voice, text, imagery, and so forth) being sent between the parties. The third party intercepts the communications by pretending to be one of the other parties (e.g., sender or receiver).

User A 302 wants to initiate a first time communication with User B 304. However in this situation a third party, illustrated as man in the middle 306, interprets the communication without the knowledge of User A 302 nor User B 304. Thus, if the man in the middle 306 can obtain control of any communication link or entity between User A 302 and User B 304, the key exchange and corresponding communication is vulnerable.

In this example, User A 302 and User B 304 agree to use a prime number p and a base g. User A 302 chooses a secret integer a and sends ($g^a$ mod p) to User B 304. Man in the middle 306 intercepts this communication and, acting as if it were User A 302, transmits ($g^c$ mod p) to User B 304. Similarly, User B 304 chooses a secret integer d and sends ($g^d$ mod p) to User A 302. However, this is intercepted by man in the middle 306, who transmits ($g^b$ mod p) to User A 302, while pretending to be User B 304. User A 302 and User B 304 do not realize that they are not on a secure connection nor do they realize they are not communicating directly with each other. Thus, User A 302 computes ($g^b$ mod p)$^a$ 308 and User B computes ($g^c$ mod p)$^d$ 310. These are intercepted by man in the middle 306 who utilizes these key exchanges to monitor and intercept the communications between User A 302 and User B 304 during a current and subsequent communications. Thus, man in the middle 306 pretends to be both parties on both sides in a back and forth manner.

Since User A 302 and User B 304 did not have a pre-established relationship (e.g., they did not know anything about each other), it is easy for man in the middle 306 to impersonate either party. Thus, for peer-to-peer key exchanges that are anonymous (e.g., not preexisting) it may be unlikely that there will be a secured key exchange over a single channel.

To mitigate such man in the middle attacks, PKI and other centrally managed solutions can be utilized. However, such solutions can be expensive, complex and may possibly be in control by some entity (e.g., government agencies, IT insider, hacker, and so forth), which may not be desirable to some users. Thus, the disclosed embodiments can create a trusted session, making man in the middle attacks more complex thus mitigating such attacks.

Figure 4:
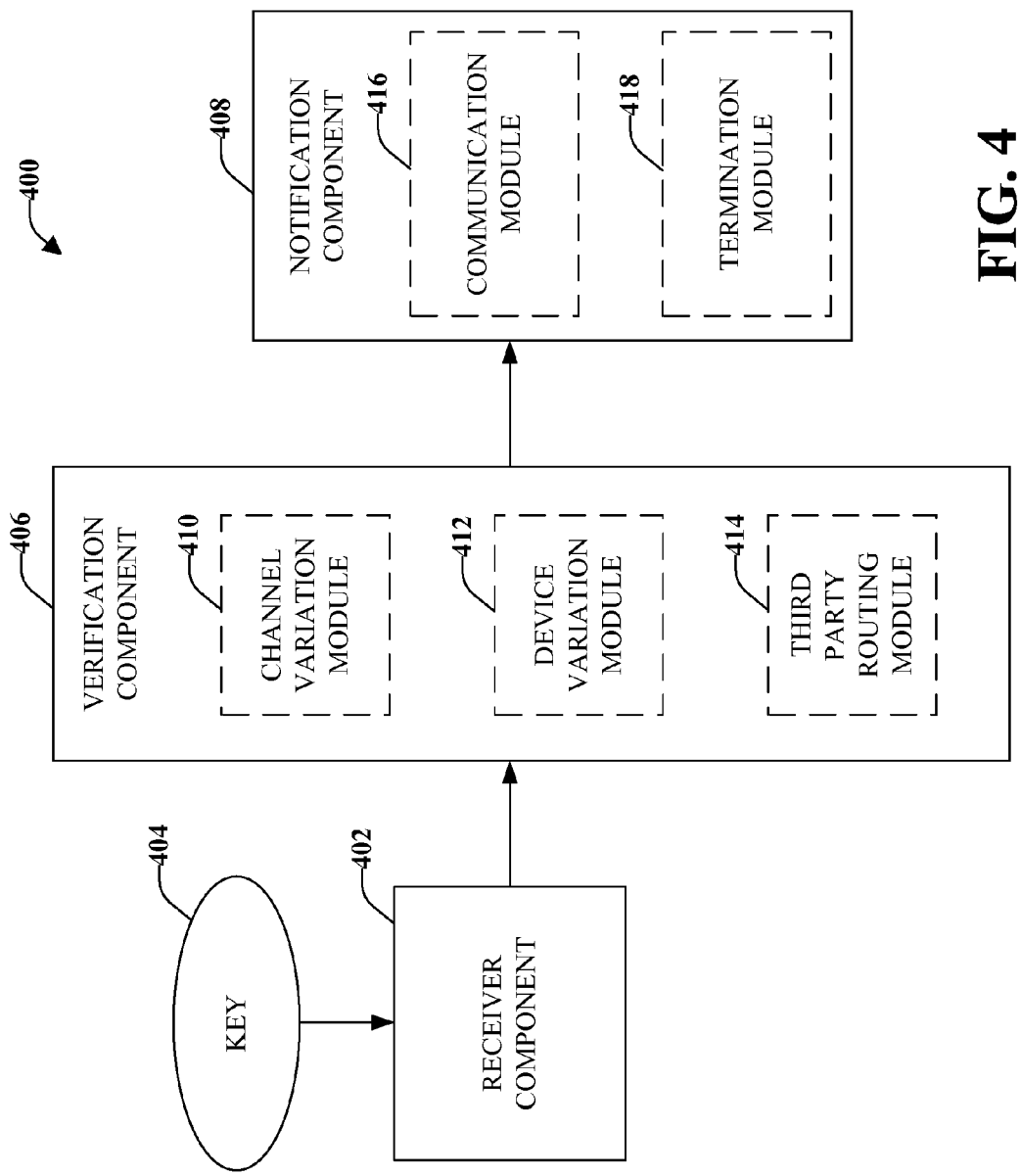
FIG. 4 illustrates a block diagram of a system for verification of peer-to-peer cryptographic key exchanges to detect a man in the middle vulnerability.

FIG. 4 illustrates a block diagram of a system 400 for verification of peer-to-peer cryptographic key exchange to detect a man in the middle vulnerability. Since system 400 can be implemented for peer-to-peer networks, a trust dependency on a centralized service or server can be mitigated. System 400 can automatically verify key exchanges to determine whether such key exchanges were subject to man in the middle attacks and notify the communicating parties (e.g., sender, receiver) whether the communication is secure or not secure.

System 400 includes a receiver component 402 that can be configured to receive information relating to exchanged keys 404 within a peer-to-peer network. Such key exchange can be implemented utilizing any type of key exchange technique and includes both symmetric cryptography and asymmetric cryptography.

After the key exchange occurs, verification component 406 can automatically, or in some embodiments, based upon a user request, verify if the key exchange is secure or whether it was intercepted by one or more entities. An optional notification component 408 can notify the users whether the key exchange was secure or not secure.

In further detail, verification component 406 can include a channel variation module 410 that can be configured to determine the channel or interface over which the key exchange occurred and change the channel or interface so that the key exchange verification occurs over a different channel or interface. The secondary channel may have been a channel established at an earlier time. The secondary channel can be any way of communicating as long as there is authentication (e.g., text message).

A device variation module 412 can be included in verification component 406. The device variation module 412 can be configured to determine the device utilized during the key exchange and utilize a different device for verification of the key exchange.

Also included in verification component 406 can be a trusted third party routing module 414 that can be configured to route the key exchange verification communication through a trusted third party. Such routing can occur when a different channel and/or device is not available for the key exchange verification.

In some embodiments, an optional notification is provided to one or more intended parties (e.g., sender, receiver) to the conversions. Such notification can be presented to the users through an interface provided by notification component 408. A communication module 416 can be configured to present the results (e.g., secure, not secure) of the key exchange verification. Various techniques can be utilized to provide the results to the user, such as audio, visual, or other notification techniques. For example, if the key exchange verification is secure, the user can hear a chime, beep, or tone. In some embodiments, a light or text message can provide a visual notification that the key exchange verification is secure. Similar techniques can be utilized to notify the user that the key exchange verification was not secure (e.g., subject to man in the middle attack).

In some embodiments, a termination module 418 can be configured to terminate a communication if the key exchange verification revealed that the exchange was not secure. The termination module 418 can also be configured to not allow communication between the parties until a secure key exchange is verified. If the communication is not allowed until after verification, communication module 416 can notify the user when it is acceptable to proceed with the communication.

Figure 5:
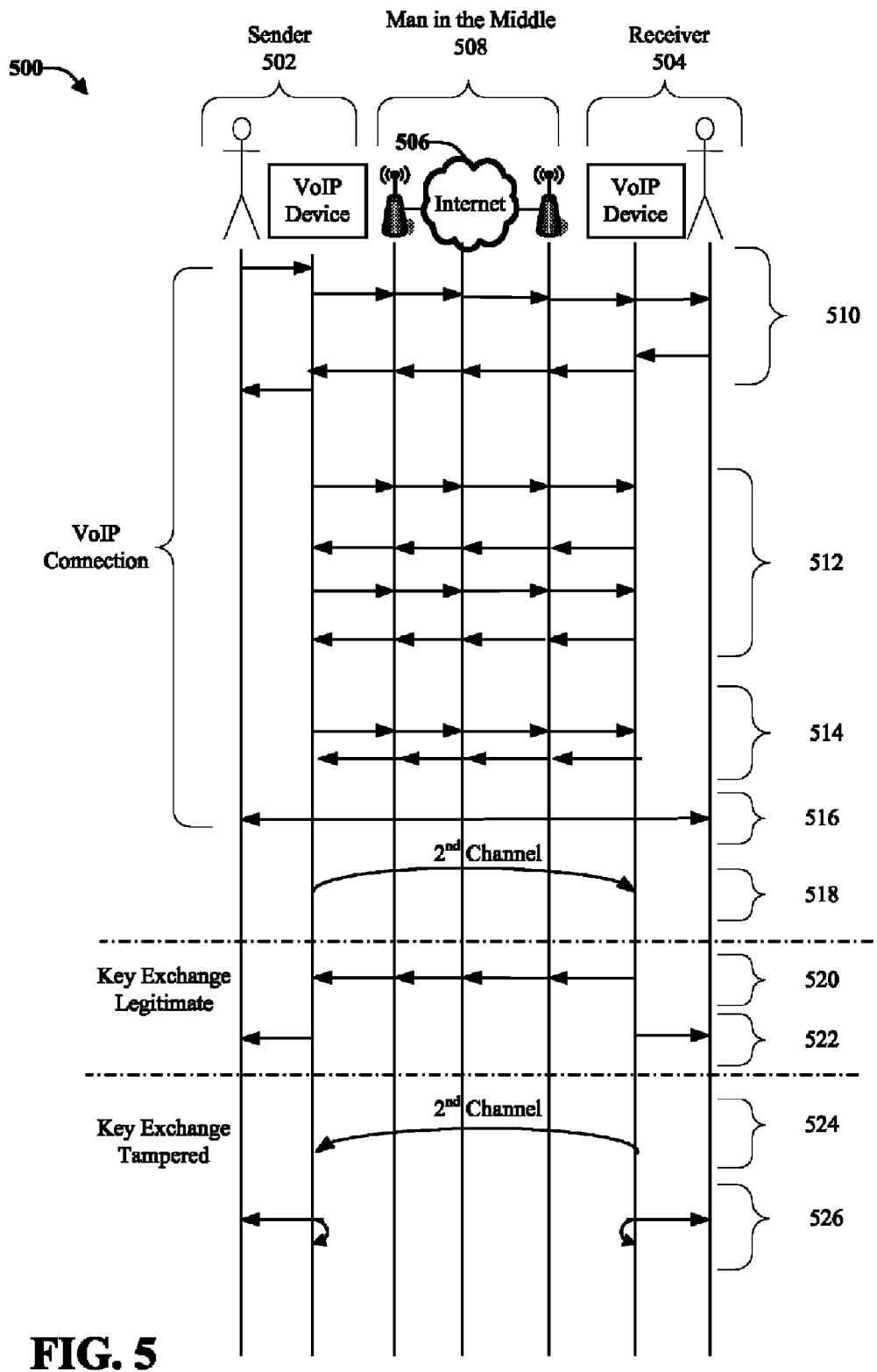
FIG. 5 illustrates an exemplary ceremony analysis of key exchanges in accordance with the disclosed embodiments.

FIG. 5 illustrates an exemplary ceremony analysis 500 of key exchanges in accordance with the disclosed embodiments. Key exchange verification can utilize a second or more network channels, devices, a third party or combinations thereof to verify a key exchange was not tampered with in order to increase the trustworthiness of the exchange. The additional functionality can be performed by the devices that are exchanging keys. Also provided can be an optional user-notification that can occur after the verification process.

As illustrated, a sender 502 can initiate a communication with a receiver 504 through the Internet 506. The sender 502 and receiver 504 can communicate through respective devices, such as VoIP devices. The communication between the sender 502 and receiver 504 can be compromised at any point in the link by a man in the middle attack 508.

The following will illustrate a protocol that can be utilized to verify key exchanges in accordance with the disclosed embodiments. A call is initiated, at 510, from sender 502 and intended for receiver 504. A key exchange can occur, at 512, utilizing for example the four-step process discussed above with reference to FIG. 2. However, other key exchange techniques can be utilized.

A connection that is believed to be secure can be established, at 514. Such a connection may be believed to be secure because of the manner by which the man in the middle impersonates each party while intercepting the key exchange and subsequent communications. At 516, the VoIP call can begin, thus completing the VoIP connection process.

At 518, a key exchange verification is sent over a second (or more) channels. This second channel should be a channel different from that channel utilized to exchange keys. The key exchange verification can reveal whether the key exchange is legitimate (e.g., there is no man in the middle attack) or if the key exchange is tampered with (e.g., there is a man in the middle attack).

If the key exchange is legitimate, at 520 the sender device is informed that the exchange was successful. The respective devices inform the users, at 522, that a "secure connection is verified" through various means (e.g., audio, visual, and so on).

If the key exchange is tampered with, at 524, the sender device is informed that the exchange was tampered with. This notification can be sent over the second channel, bypassing the man in the middle 508. The users can be informed, at 526 that the key-exchange failed and/or the communication can be disconnected.

Figure 6:
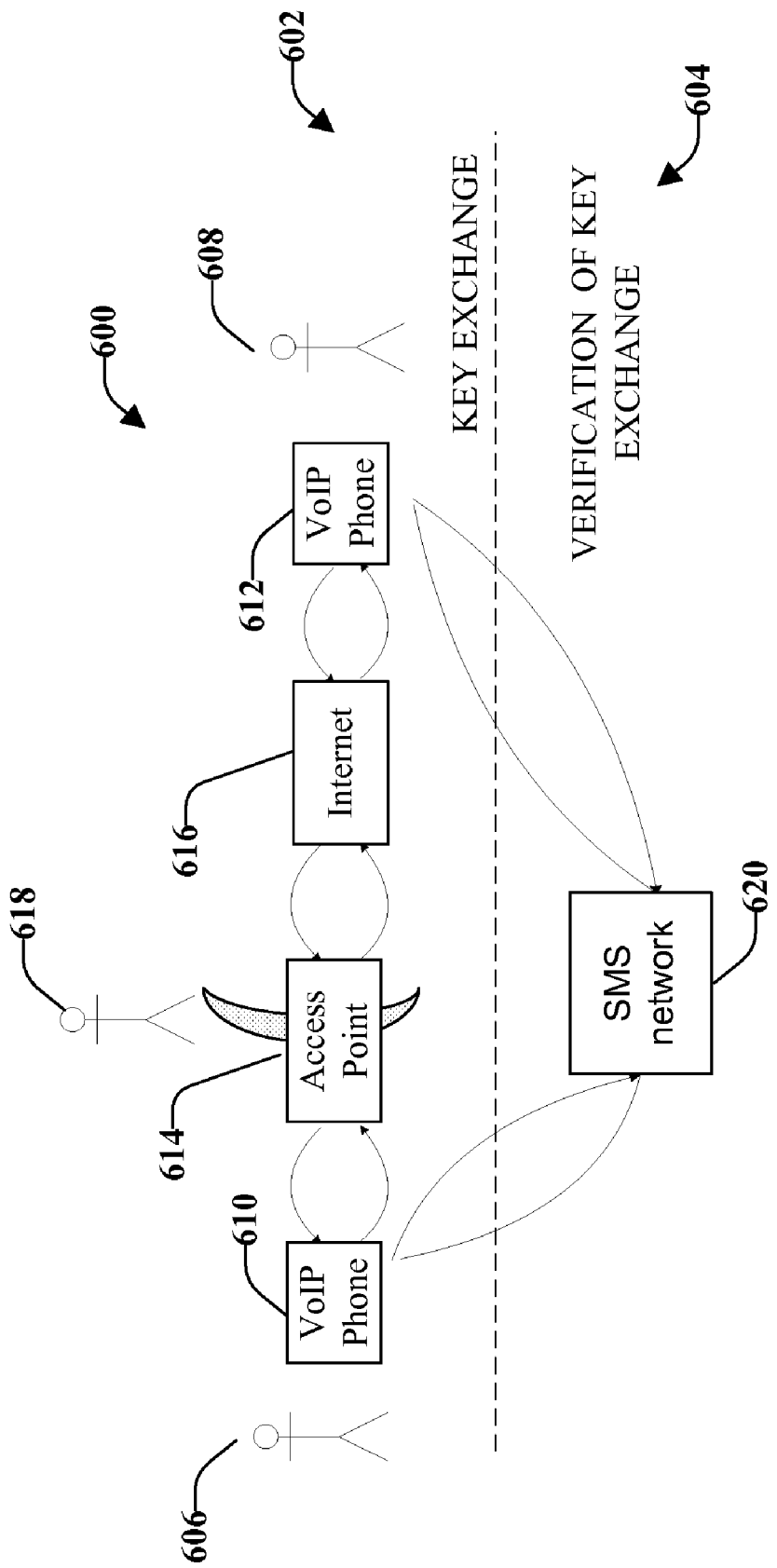
FIG. 6 illustrates a visual representation of a key exchange and a key exchange verification utilizing at least two different networks in accordance with the disclosed embodiments.

With reference now to FIG. 6, illustrated is a visual representation of a key exchange and a key exchange verification 600 utilizing at least two different networks in accordance with the disclosed embodiments. A key exchange can occur utilizing a first network, such as a VoIP network 602, and a verification of the key exchange can occur on a second network, such as an SMS network 604 comprising an SMS device 620, for example. User A 606 desires to call User B 608 utilizing VoIP on User A's mobile device 610 over an untrusted wireless network (or a network whose trustworthiness is unknown). User A 606 can choose User B 608 from User A's VoIP contact list and hit "connect" or establish the connection in some other manner. A connection can be established from User A's mobile device 610 through one or more access points 614 to connect to the Internet 616 and establish a connection with User B's mobile device 612. The VoIP software on User A's mobile device 610 performs a key exchange with User B 608, utilizing any key exchange technology. User A 606 and User B 608 can connect using the VoIP network 602.

At any time during the key exchange between User A 606 and User B 608, a man in the middle 618 attack can occur without the knowledge of either user. Therefore, a key exchange verification can be performed. User A's mobile device 610 can send a "key exchange verification message" to User B 608 utilizing the SMS network 604, for example. User B's mobile device 610 can verify the key exchange was successful, and can send back an acknowledgement to User A 606. If the key exchange was not successful, User A 606 can be informed and provided an option to disconnect.

Figure 7:
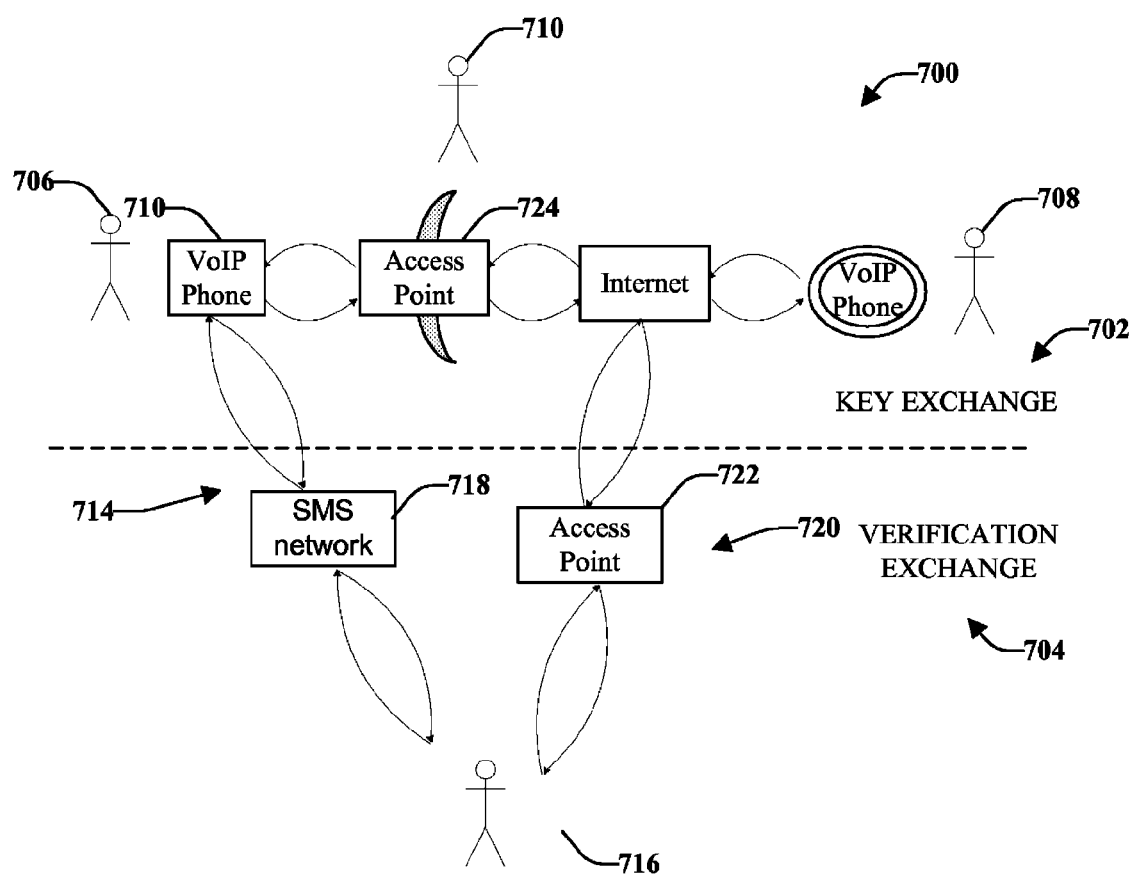
FIG. 7 illustrates a key exchange and a key verification utilizing a trusted third party.

FIG. 7 illustrates a key exchange and a key verification 700 utilizing a trusted third party. The trusted third party can be a person and/or entity with whom a sender has an existing trusted relationship. The trusted third party can provide a different channel or device to verify whether a key exchange was subject to a vulnerability, such as a man in the middle attack.

Key exchange 702 is illustrated at the top of the figure and verification exchange 704 is illustrated at the bottom of the figure. For this example, sender 706 wants to call receiver 708 utilizing VoIP on sender's mobile device 710 over a wireless network. It is not known whether the wireless network can be trusted or secure and can be vulnerable to a man in the middle attack 710. For this example, receiver 708 does not support SMS.

Sender 706 can choose receiver 708 from a contact list since, for this example, sender 706 and receiver 708 have a pre-established relationship. The VoIP software on sender's mobile device 710 can perform a key exchange with receiver 708. Sender 706 and receiver 708 can connect using VoIP.

Sender's device 710 can send a "key exchange verification message 714 to a trusted friend 716 or contact (which can be a user and/or entity) over SMS 718. The trusted friend 716 can communicate the key verification 720 with receiver 708. This communication can be through an access point 722, which can be different than the (untrusted) wireless access point 724 utilized for the Internet communication (e.g., key exchange 702) between sender 706 and receiver 708.

If the key exchange was successful with receiver 708 over the Internet 702, trusted friend 716 can return an acknowledgment to sender 706 over SMS 718. If the key exchange was not successful, sender 706 can be informed over the SMS connection 718 and can be provided the option to disconnect.

In the above embodiment, an alternative interface (e.g., SMS) can be leveraged that can probabilistically increase the trustworthiness of anonymous (VoIP) key exchanges. This can add an additional layer of assurance that the key exchange was not compromised by a vulnerability (e.g., man in the middle). The system could leverage one or more contacts per key exchange to add probabilistically more trust. However, for ease of simplicity only one contact is shown and described.

Using the additional interface (e.g., SMS in the above example) can bypass the man in the middle attack, if any, on the Internet path between sender 706 and receiver 708 (e.g., untrusted wireless access point 724). Also, using the additional interface as a verification channel bypasses man in the middle attacks, if any, on both the Internet path and the SMS network. Text messaging can have the advantage of being a different interface than Sender's 706 Internet connectivity and, therefore, unless a man in the middle compromises both Sender's Internet connection and the cellular text-messaging network, it is probable that sender 706 was not compromised by a man in the middle vulnerability at both the Internet 702 and the SMS 704 throughout the proposed key exchange theme.

The disclosed embodiments can add a probabilistic verification step to key exchanges by leveraging a friend(s), contact (s) or additional interface. This can add an additional layer of assurance that the key exchange was not compromised by a man in the middle vulnerability. The one or more friend(s), contact(s) or interface per key exchange can be leveraged for verification to increase the "trust" probability. It is unlikely that the friend is connecting through the same man in the middle, although it is also possible. This is probabilistic because there is a possibility that the additional interface is also compromised by the same man in the middle.

By way of example and not limitation, users have a set of contacts on their devices, which are somewhat trusted (e.g., email contacts, instant messaging contacts, phone lists). For text messaging and SMS contacts, text messaging has the advantage of being a different interface. For the most part, most mobile devices, such as mobile phones, are on (e.g., activated) even when the contacts are not available. Thus, leveraging their phone for an automated task, such as key verification, is possible.

Leveraging general packet radio service (GPRS) IP capabilities can be used for the key exchange verification embodiments disclosed herein. For example, to verify a key exchange on 802.11 over an untrusted network, one can use a GPRS interface to verify a key exchange.

The following will discuss verifying a key exchange around a man in the middle. By leveraging a different interface for verification, it can be probabilistically assured that a man in the middle is most likely not compromising both interfaces. For example, sender wants to create a VoIP connection with receiver over an untrusted wireless connection. Sender and receiver agree to use a prime number p and base g. Sender then chooses a secret integer a and sends receiver ($g^a$ mod p). Receiver chooses a secret integer b and sends sender ($g^b$ mod p). Sender computes ($g^b$ mod p)$^a$ and receiver computes ($g^a$ mod p)$^b$.

Sender transmits a text message to trusted friend with a hash of ($g^b$ mod p)$^a$. Trusted friend's device recognizes the text message as a verification request and forwards it through to receiver. Receiver verifies the hash of ($g^b$ mod p)$^a$ and sends receiver signed (($g^b$ mod p)$^a$). Receiver can forward the hash of ($g^b$ mod p)$^a$ to sender. Sender can then verify whether the key exchanged with receiver was valid or not valid.

Figure 8:
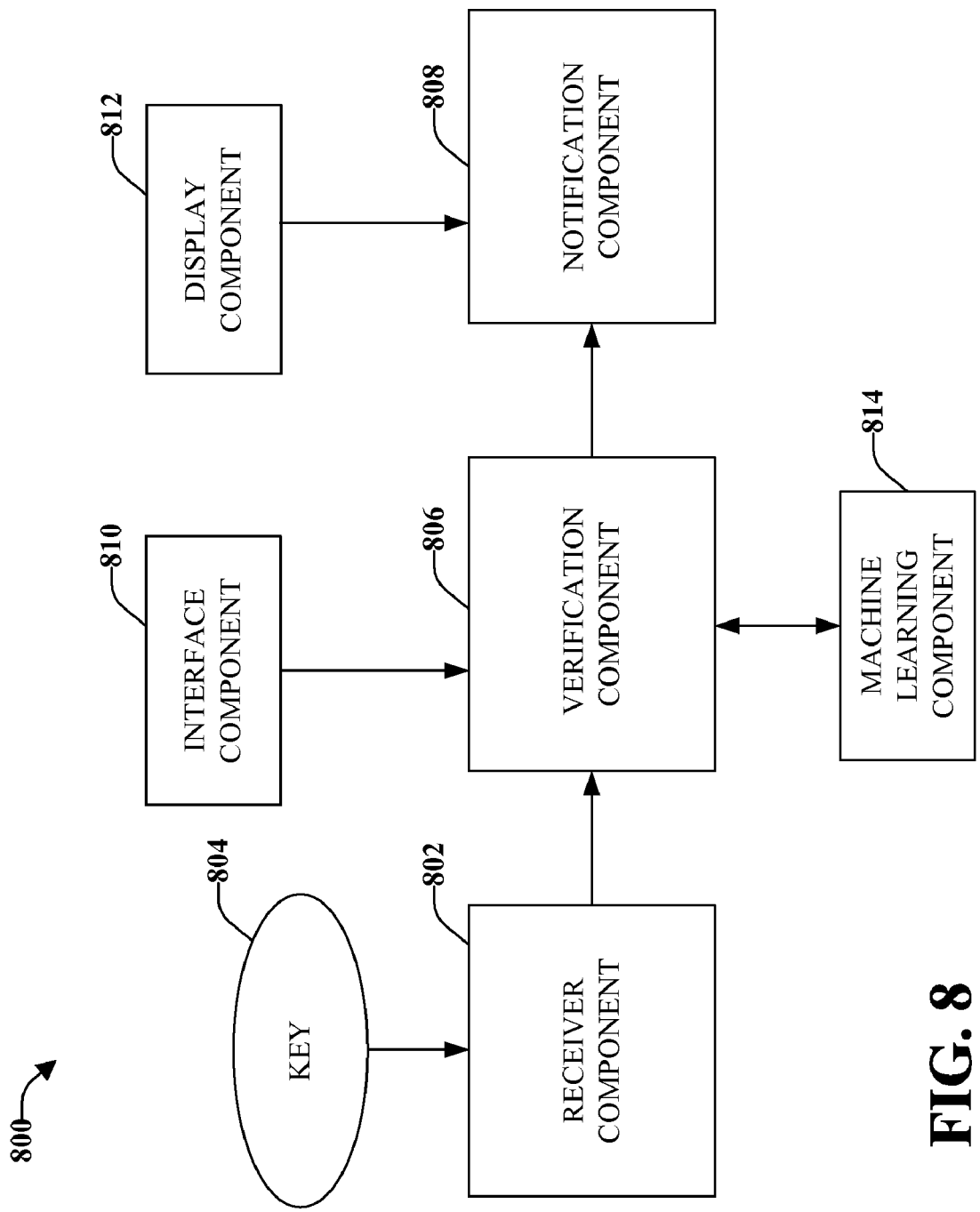
FIG. 8 illustrates a system that provides verification of a key exchange.

FIG. 8 illustrates a system 800 that provides verification of a key exchange. System 800 includes a receiver component 802 that can be configured to receive cryptographic key exchange information 804. A verification component 806 can be configured to verify whether the key exchange was secure (e.g., there was not a man in the middle vulnerability). A notification component 808 can be configured to notify a user whether the key exchange was secure or not secure. If not secure, appropriate action can be taken (e.g., disconnecting the communication, proceeding with the communication with the understanding that it is not secure).

An interface component 810 can be provided to allow a user to request verification component 806 to verify whether the key exchange was secure. For example, the interface component 810 can be, but is not limited to being, a keyboard, a mouse, a pressure-sensitive screen, a graphical user interface, a microphone, and voice recognition software. The results of the key verification can be presented to the user through a display component 812 such as a graphical user interface.

In some embodiments, a machine-learning component 814 can be utilized with the disclosed techniques. The machine-learning component 814 can employ artificial intelligence based systems (e.g., explicitly and/or implicitly trained classifiers) in connection with performing inference and/or probabilistic determinations and/or statistical-based determinations with respect to which channel, device, trusted friend to use for key exchange verification. As used herein, the term "inference" refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, and so forth) can be employed in connection with performing automatic and/or inferred action in connection with the disclosed techniques.

In view of the exemplary systems shown and described above, methods that may be implemented in accordance with the disclosed subject matter are provided. While, for purposes of simplicity of explanation, the methods are shown and described as a series of blocks, it is to be understood and appreciated that the disclosed embodiments are not limited by the number or order of blocks, as some blocks may occur in different orders and/or concurrently with other blocks from what is depicted and described herein. Moreover, not all illustrated blocks may be required to implement the methods described. It is to be appreciated that the functionality associated with the blocks may be implemented by software, hardware, a combination thereof or any other suitable means (e.g. device, system, process, component). Additionally, it should be further appreciated that the methods disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 9:
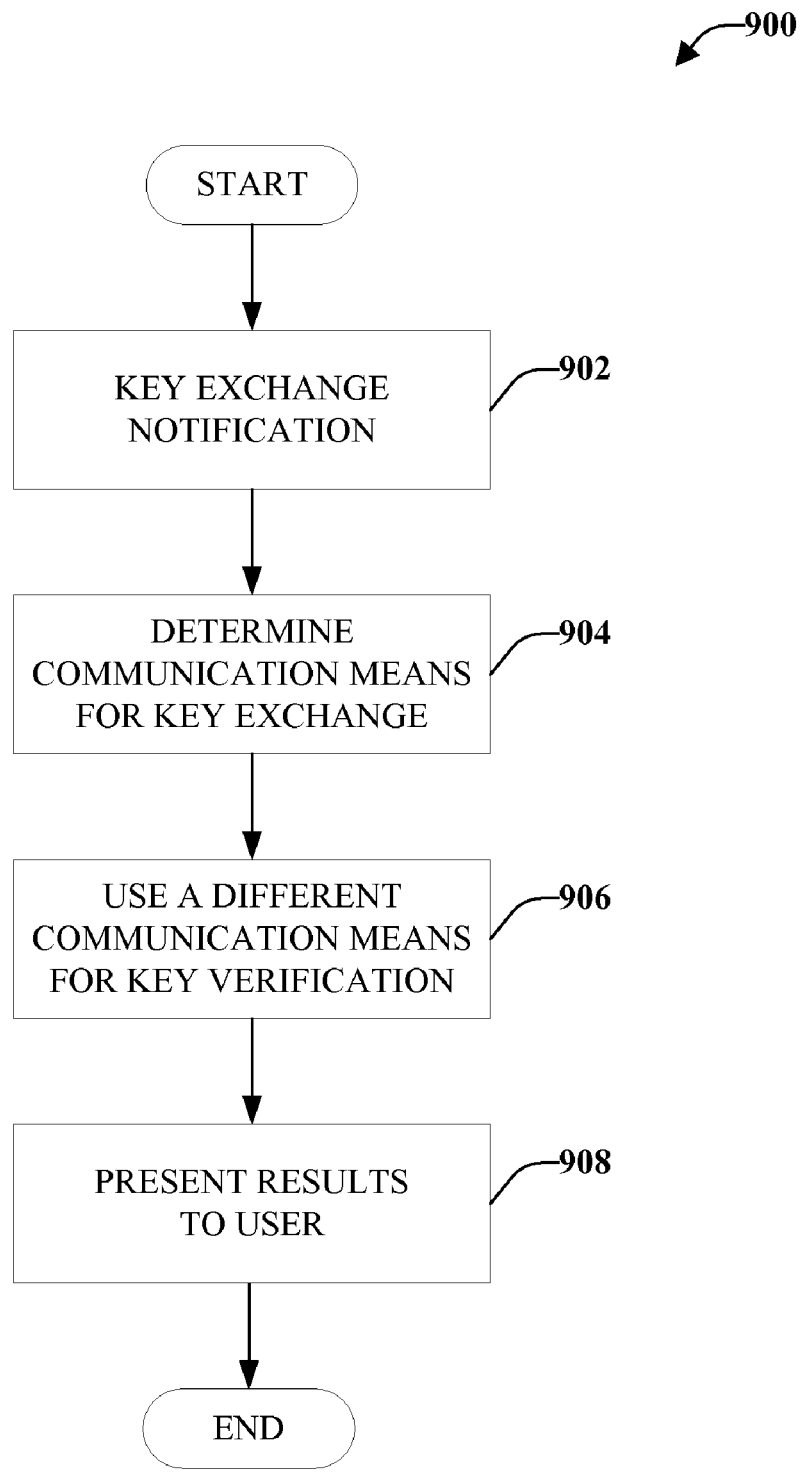
FIG. 9 illustrates a method for verification of key exchanges.

FIG. 9 illustrates a method 900 for verification of key exchanges. Such verification can provide a sender and a receiver with information relating to the integrity or security level of the communication between the sender and receiver. Method 900 starts at 902, when a key exchange notification is received. The key exchange can be implemented utilizing any key exchange technique. The key exchange can be performed by peer-to-peer devices on a channel, network or device that can be compromised by a man in the middle attack.

At 904, a determination is made relating to the communication means used during the key exchange. The key exchange may have been conducted utilizing an Internet network, an SMS network, or other network, device or communication means. In order to determine if the key exchange was subject to a man in the middle attack, a communication means different from the communication means of the key exchange is utilized, at 906. In addition, more than one communication means can be utilized, depending on the security detection level desired.

The results of the key exchange verification can be presented to the user, at 908. If the key exchange was valid (e.g., no man in the middle vulnerability) the users (e.g., sender and receiver) can be notified that they are communicating on a secure channel. If the key exchange was not valid (e.g., man in the middle vulnerability), the users can be notified and a communication between the users terminated. In some embodiments, the communication between the users does not proceed until after the key exchange has been verified and no vulnerability was found.

Figure 10:
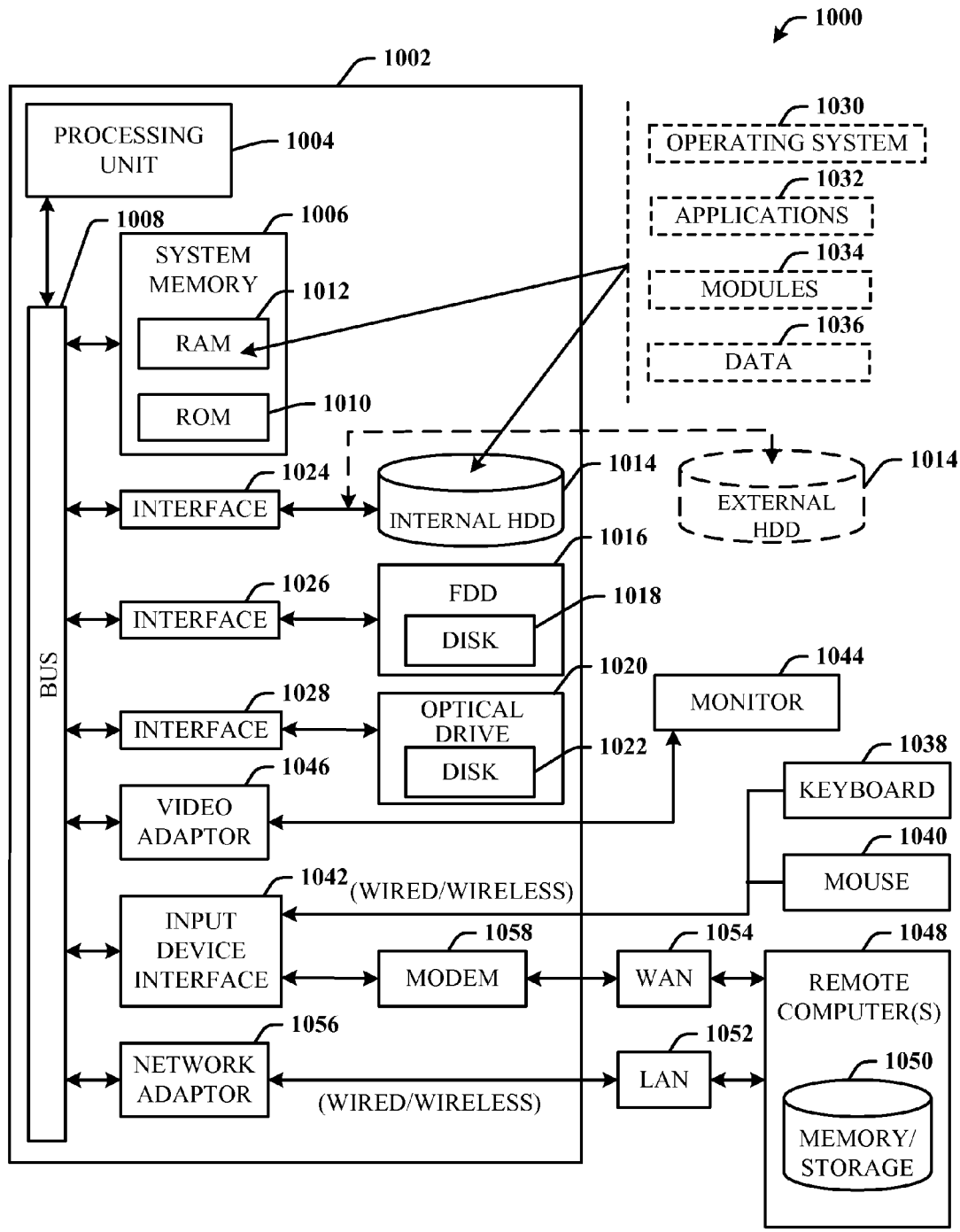
FIG. 10 illustrates a block diagram of a computer operable to execute the disclosed embodiments.

Referring now to FIG. 10, there is illustrated a block diagram of a computer operable to execute the disclosed architecture. In order to provide additional context for various aspects disclosed herein, FIG. 10 and the following discussion are intended to provide a brief, general description of a suitable computing environment 1000 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the various embodiments can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer typically includes other peripheral output devices (not shown), such as speakers, printers, etc.

The computer 1002 may operate in a networked environment using logical connections through wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
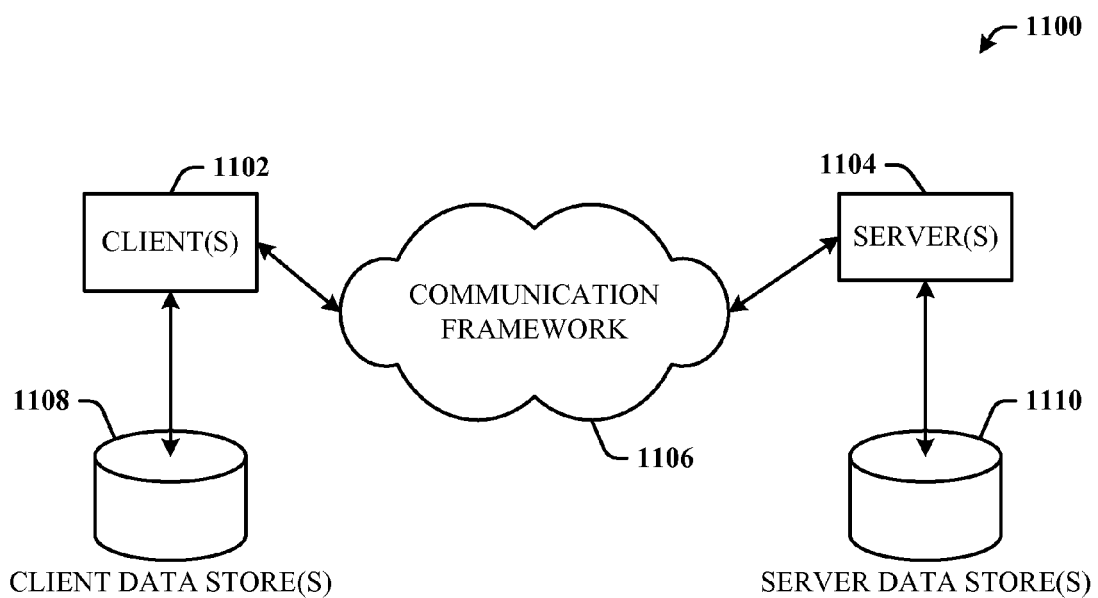
FIG. 11 illustrates a schematic block diagram of an exemplary computing environment operable to execute the disclosed embodiments.

Referring now to FIG. 11, there is illustrated a schematic block diagram of an exemplary computing environment 1100 in accordance with the various embodiments. The system 1100 includes one or more client(s) 1102. The client(s) 1102 can be hardware and/or software (e.g., threads, processes, computing devices). The client(s) 1102 can house cookie(s) and/or associated contextual information by employing the various embodiments, for example.

The system 1100 also includes one or more server(s) 1104. The server(s) 1104 can also be hardware and/or software (e.g., threads, processes, computing devices). The servers 1104 can house threads to perform transformations by employing the various embodiments, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated through a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1111 that can be employed to store information local to the servers 1104.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description or the claims is meant to be a "non-exclusive or".

What is claimed is:

1. A system, comprising:
a key exchange component configured to facilitate a cryptographic key exchange between peer-to-peer devices;
a channel variation component configured to determine at least one of a channel or interface over which the cryptographic key exchange occurred, and to change the at least one of the channel or interface to a different channel or interface; and
a verification component configured to, using the different channel or interface, determine whether the cryptographic key exchange was subject to an unauthorized interception;
wherein
the at least one channel or interface is implemented at least in part by a first packet-based network, and the different channel or interface is implemented, based on a sender request, at least in part by an established connection between a sender and a trusted entity selected by the sender, via a second packet-based network different from the first packet-based network,
the different channel or interface is accessible by at least one of a plurality of trusted entities available for key exchange verification, the at least one of the plurality of trusted entities being selected by the sender based on a receiver being unable to utilize the second packet-based network, and
the selected one of the plurality of trusted entities communicates a key verification with the receiver via an access point different from an access point of the first packet-based network connecting the sender and the receiver, and sends an acknowledgement to the sender via the second packet-based network if the key verification was successful, or informs the sender via the second packet-based network if the key verification was not successful.

2. The system of claim 1, further comprising a termination module configured to prevent communication between the peer-to-peer devices from proceeding unless it is determined that the cryptographic key exchange was not subject to an unauthorized interception.

3. The system of claim 1, wherein the first packet-based network includes a VoIP (Voice over Internet Protocol) network.

4. The system of claim 1, further comprising a device variation module configured to ascertain a type of device used during the cryptographic key exchange, and to use a different type of device from the ascertained type to determine whether the cryptographic key exchange was subject to an unauthorized interception.

5. The system of claim 1, further comprising a trusted entity module configured to route a request between the peer-to-peer devices through a trusted entity to determine whether the cryptographic key exchange was subject to an unauthorized interception.

6. The system of claim 1, wherein the at least one channel or interface is non-secure.

7. The system of claim 1, further comprising a notification component configured to notify at least one of the peer-to-peer devices whether the cryptographic key exchange was subject to an unauthorized interception.

8. The system of claim 1, further comprising a termination module configured to, in response to a determination that the cryptographic key exchange was subject to an unauthorized interception, terminate a communication between the peer-to-peer devices.

9. The system of claim 7, wherein the notification component is configured to notify the at least one of the peer-to-peer devices using the different channel or interface.

10. The system of claim 3, wherein the second packet-based network includes a Systems Management Server (SMS) network.

11. The system of claim 1, wherein the verification component is further configured to use the different channel or interface to determine whether the cryptographic key exchange was subject to an unauthorized interception in response to a request.

12. A method, comprising:
receiving notification of a key exchange pursuant to a peer-to-peer communication between a sender device and a receiver device;
determining a communication channel used for the key exchange; and
checking the key exchange for an unauthorized interception, using another communication channel, the determining and the checking including
implementing the communication channel at least in part with a first packet-based network;
implementing the other communication channel at least in part with a second packet-based network;
based on a request from the sender device, establishing a connection via the second packet-based between the sender device and a trusted entity selected by the sender device based on a receiver device being unable to utilize the second packet-based network;
communicating, by the trusted entity, a key verification with the receiver device via an access point different from an access point of the first packet-based network connecting the sender device and the receiver device; and
sending an acknowledgement via the second packet-based network by the trusted entity to the sender device if the key verification was successful, or informing the sender device via the second packet-based network by the trusted entity if the key verification was not successful.

13. The method of claim 12, further comprising, in response to the checking indicating that the key exchange was subject to an unauthorized interception, preventing a communication between the sender device and the receiver device from proceeding.

14. The method of claim 12, further comprising implementing the first packet-based network at least partly with a VoIP network.

15. The method of claim 14, further comprising implementing the second packet-based network at least partly with an SMS network.

16. The method of claim 12, further comprising automatically disconnecting the peer-to-peer communication between the sender device and the receiver device in response to the checking indicating that the key exchange was subject to an unauthorized interception.

17. The method of claim 12, further comprising:
by the sender device, sending a text message with a hash via the communication channel to the trusted entity, and
by the trusted entity, recognizing the text message as a verification request and forwarding the text message to the receiving device.

18. A computer-readable non-transitory storage medium tangibly embodying instructions that when executed by a computing device cause the computing device to perform operations comprising:
(i) receiving notification of an exchange of cryptographic keys between two peer-to-peer devices;
(ii) determining at least one of a network or device via which the exchange occurred; and
(iii) determining, via at least one of another network or device, whether the exchange of cryptographic keys between the two peer-to-peer devices was subject to an unauthorized interception, (ii) and (iii) including
implementing the at least one network or device at least in part with a first packet-based network;
implementing the at least one other network or device at least in part with a second packet-based network;
based on a request from a sender peer device, establishing a connection via the second packet-based between the sender peer device and a trusted entity selected by the sender peer device based on a receiver peer device being unable to utilize the second packet-based network;
communicating, by the trusted entity, a key verification with the receiver peer device via an access point different from an access point of the first packet-based network connecting the sender peer device and the receiver peer device; and
sending an acknowledgement via the second packet-based network by the trusted entity to the sender device if the key verification was successful, or informing the sender device via the second packet-based network by the trusted entity if the key verification was not successful.

19. The computer-readable non-transitory storage medium of claim 18, the operations further comprising implementing the first packet-based network at least partly with a VoIP network.

20. The computer-readable non-transitory storage medium of claim 18, the operations further comprising automatically disabling a communication if the determining determines that the exchange of cryptographic keys between the two peer-to-peer devices was subject to an unauthorized interception.

* * * * *